R. M. FRANKLIN.
LANDING NET.
APPLICATION FILED APR. 25, 1914.
1,143,759.
Patented June 22, 1915.
2 SHEETS—SHEET 2.
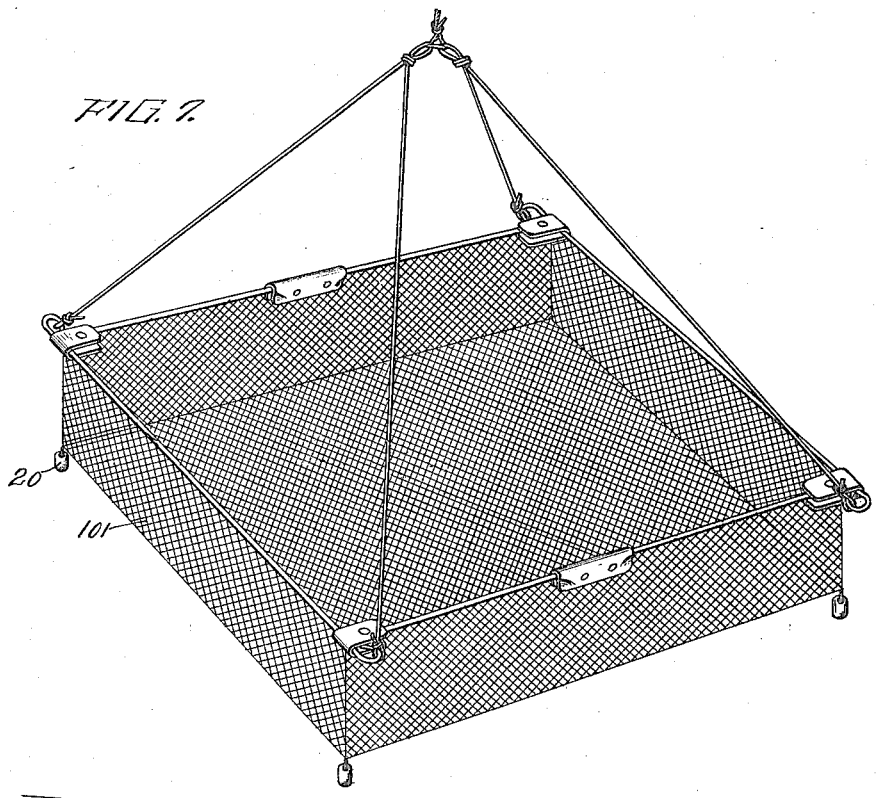
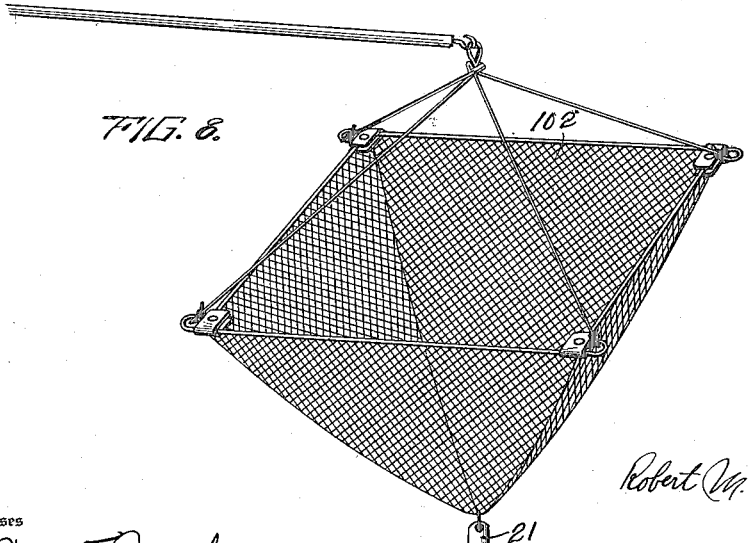

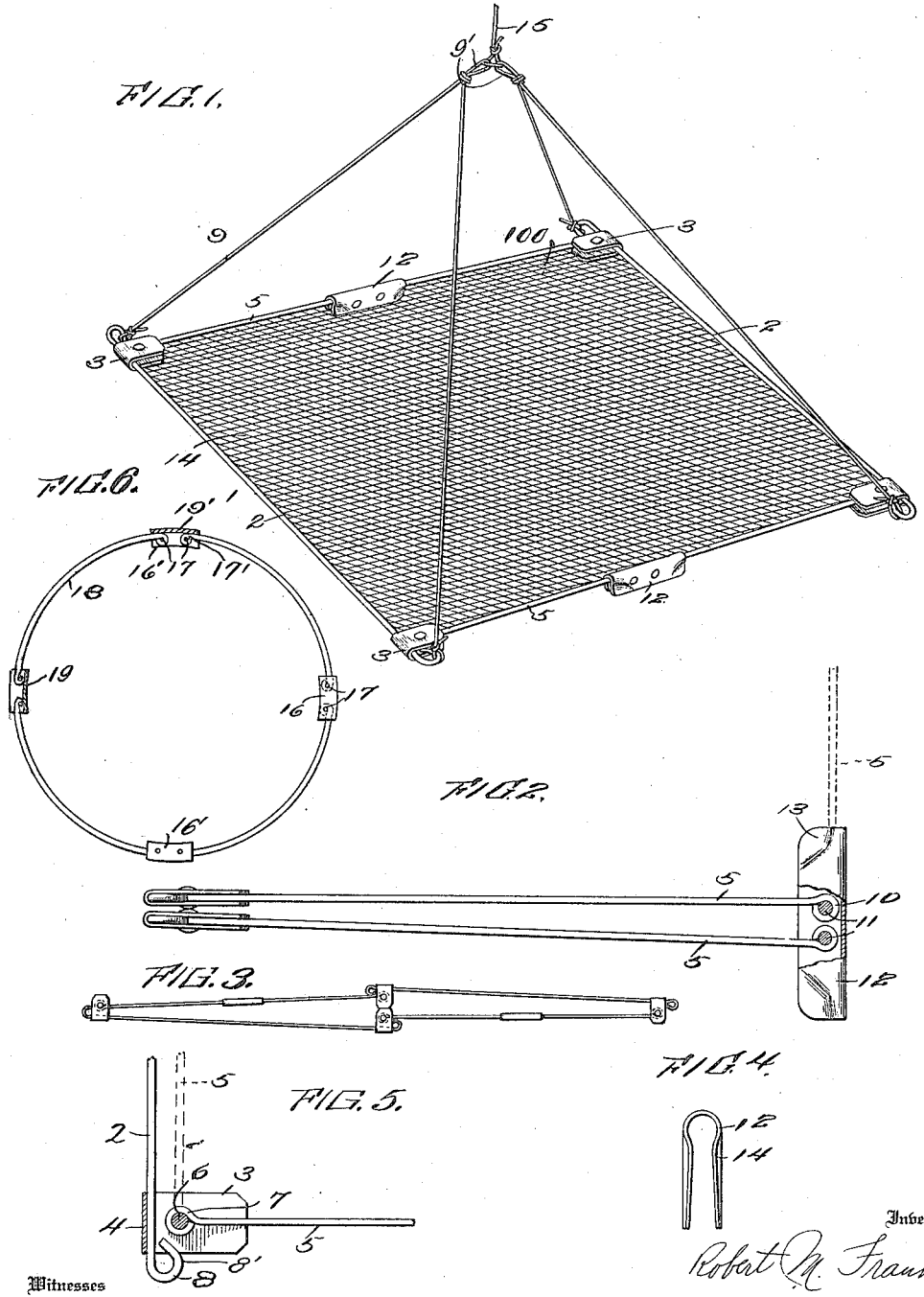

UNITED STATES PATENT OFFICE.

ROBERT M. FRANKLIN, OF GALVESTON, TEXAS.

LANDING-NET.

1,143,759.  Specification of Letters Patent.  Patented June 22, 1915.

Application filed April 25, 1914. Serial No. 834,450.

*To all whom it may concern:*

Be it known that I, ROBERT M. FRANKLIN, a citizen of the United States, residing at Galveston, in the county of Galveston and State of Texas, have invented certain new and useful Improvements in Landing-Nets; and I do hereby declare the following to be a full, clear, and exact description of the invention, such as will enable others skilled in the art to which it appertains to make and use the same.

This invention relates to improvements in landing nets and an object of the invention is to provide a net of this character which may be folded or collapsed into a compact mass for storing the same during seasons when it cannot be used.

A further object of the invention is to provide a landing net having improved forms of strap hinges at the corners thereof which serve to guide the end and side members of the trap when being folded.

A still further object of the invention is to provide a form of trap frame which may be used either with a net stretched tightly across the frame or depending from the frame and held in lowered position by means of weights.

With these and other objects in view the invention comprises certain novel constructions, combinations, and arrangements of parts as will be hereinafter more fully described and claimed.

In the accompanying drawings, wherein similar reference characters designate corresponding parts: Figure 1 is a perspective view of one form of my trap. Fig. 2 is a side elevation of one end of the trap showing the manner of folding the same. Fig. 3 is a top plan view of the trap after the same has been folded, the net being removed. Fig. 4 is an edge view of one of the U-shaped straps which are used when a two-part end member is used in constructing the trap. Fig. 5 is a horizontal section showing the method of connecting the side and end members at one corner of the frame. Fig. 6 indicates a top plan view of a modified form of the invention. Fig. 7 shows a perspective view of a still further modification of the invention, the frame being substantially that as shown in Fig. 1, but the net being of modified form. Fig. 8 is a perspective view of a still further modified form of net which may be associated with the frame.

The general aim of the present invention is to provide a frame for landing nets having end and side members pivotally connected together by means of U-shaped clips provided with rivets which engage eyes at the ends of the side or end members, as the case may be, to afford a pivotal connection therefor.

In the forms of the invention which I have chosen to illustrate in the drawings, side members have been provided with eyes of such construction as to hold the net together should the clip come loose from the member with which it is normally made rigid, these eyes serving to receive bail cords. When it is desired to make a large frame, the end members are made in sections or parts connected by hinges which clamp the parts so as to hold the same in extended position and prevent accidental collapsing of the same.

Referring to Figs. 1 to 5 inclusive, where the preferred form of my invention is shown, it will be seen that the frame 1 comprises side members 2, the ends of which have secured thereto U-shaped clips 3 whose bends are rounded as at 4 to conform to the surface of the side members 2. The end frame members 5 are interposed between the opposite ends of the side members 2 and in order that the same may be held to the side members pivotally there is provided a rivet 6 passing between parallel sides of the clip and through an eye 7 formed in the end of the end member 5. The ends of the side members 2 extend beyond the clips 3 and are curved so as to form eyes 8 as seen in Fig. 5, the inner portion of each eye 8 extending into the clip and the outer portion being exposed as at 8', so that should the clip 3 become dislocated or loosened from side member 2 it will not be possible for it to slip off. This insures that the frame will always remain a closed figure, so that the netting will not become torn.

In order that the net may be supported, there are provided bail cords 9, the lower ends of which engage the eyes 8 formed in the ends of the side members 2, these bail cords being joined above the net in any approved manner, the manner shown being to provide the bail cords secured to the opposite sides of the frame with loops 9', which receive the hoisting cords 15.

When a small size landing net is to be used the ends may be made of a single piece of wire or other suitable material; but if it be desirable to make the landing net in any larger size, then it is preferable to have the ends made up of parts pivotally united. For this purpose there is provided the knuckle hinge which is provided with rivets 11 adapted to receive the eyes 10 formed on the ends of the parts of the end members 5 remote from the clips 3. By referring to Fig. 4, it will be seen that each hinge includes a clamping strap 12 which is folded into U-shape and has the corners thereof pressed together as at 13.

When the frame of the net is extended, as seen in Fig. 1, the open portion of the strap 12 is facing downwardly, so that the end members may be made substantially rigid so far as downward pressure upon the netting 100 is concerned. It will be understood that when the end members are in the position seen in Fig. 1, the contacting corners 13 serve to make the upper portion of the ends of the clamping strap 12 of a contour more than a half-circle, into which the ends 5 will fit to prevent accidental displacement of said ends. Of course, the clamping strap 12 is made of such material as will readily admit of the collapsing of the frame when such is desired. For instance, the end members may be moved from the dotted line position seen in Fig. 2 to the full line position, a springing on the part of the corners being of course necessary for this movement. After the frame has been folded to the position shown in Fig. 2, the end members 5 may then be folded against the side members 2, as seen in Fig. 5 at the dotted lines. It will be understood, of course, that this method of folding the frame is only used when the frame is large, and even under these circumstances it is not necessary to fold the frame in this manner, although this is the preferable way of folding the frame. As seen in Fig. 3, the preferred way of folding the frame is to draw diagonally opposite corners of the frame together, which is accompanied by a corresponding separation of the other pair of diagonally opposite corners. It is found that the netting is sufficiently elastic to permit this collapsing of the frame, and this method of collapsing the frame may be used either with small or large nets.

By referring to Fig. 6, there will be seen a modified form of the landing net, wherein the net is made substantially circular. It will be seen that the clips 16, which are formed on the opposite sides of the frame, have the rounded portions thereof 19 facing the center of the frame, whereas the clips 16' at the top and bottom of the frame have rounded portions 19' facing away from the center of the circle, there being provided in each instance rivets 17, comparable with rivets 6 of the preferred form which receive eyes 17' formed upon the ends of the members 18 which comprise the circular frame here shown. By reason of the position of the rounded portions of these clips 16 and 16' it will be seen that the sides of the frame may be drawn together, while at the same time the top and bottom of the frame may be separated inasmuch as the members 18 near their eyes can move away from the rounded portions 19' and not be bound thereby.

By referring to Figs. 7 and 8, there will be seen modified forms of net which can be employed with the frames already described. With these forms of the invention the frames, which may be made of metal, are identical with those described in connection with the preferred form of the invention, the ends 5 being hinged or formed of a single bar or in parts, according to the size of the landing net. The net 101, seen in Fig. 7, hangs from the frame substantially as shown, to form a box-like structure, the net being held by means of weights 20 depending from each corner. The form of the invention shown in Fig. 8 makes use of the frame common to all forms of the invention, while the net is formed of four triangular sheets 102, each of which depends from one of the members forming the frame, there being provided a weight 21 connected to the point at which the bottoms of all of the members 102 are connected. By means of these weights 20 and 21, the net will be held open so as to present as large a cavity as possible below the frame for the reception of game.

What I claim is:

1. A corner construction for frames comprising a side member, a U-shaped clip rigid therewith, an end member connected to the clip, the end of the side member extending beyond the clip and bent back to form an eye standing partly between the sides of the clip and having its outer portion exposed, for the purpose set forth.

2. A corner construction for folding frames comprising a U-shaped clip, a side-frame member extending through and secured in the bend of said clip and having its extremity formed into an eye standing partly between the sides of such clip, an end-frame member extending between the sides of said clip and having an eye standing nearer to its bend than the size of the eye on said side member, and a pivot connecting the sides of the clip and passing through the eye in the end member.

3. The herein described folding landing net, the same comprising a netting, a four-arm bail cord, and a frame consisting of parallel side members having eyes at their extremities to which the arms of said cord are attached, two end members whereof each is made in parts, knuckle hinges connecting the meeting ends of said parts and permitting them to fold upwardly, horizontal eyes at the outer ends of said parts, a horizontal U-shaped clip embracing each of the last-named eyes, its bend secured to one of the side bars so as to leave the eye thereof exposed for the attachment of the bail-arms, and an upright pivot through the sides of the clip and the eye in the end member.

4. In a landing net, the combination with the netting, and a frame therefor made up of side members, end members whereof each is in two parts, and pivotal connections between the outer ends of said parts and the ends of the side members; of a knuckle hinge connecting the inner ends of each pair of parts, said ends being formed into eyes standing in upright planes, the hinge consisting of a strap bent into U-shape and having its center loosely embracing said eyes and its corners pressed toward each other so as to frictionally engage the sides of said parts, and pivots connecting the sides of strap and passing through said eyes.

5. A compound knuckle hinge for the purpose set forth comprising a U-shaped metallic strap whose sides are out of contact with each other at the center of the length of the strap and whose corners are bent respectively toward each other near the ends of the length of the strap, two wire members having eyes at their extremities disposed between the sides of said strap at its center and their bodies adapted to be swung between the sides of said strap near its ends, and rivets connecting said sides and passing through said eyes, for the purpose set forth.

In testimony whereof I affix my signature in presence of two witnesses.

ROBERT M. FRANKLIN.

Witnesses:
C. HARPER ANDERSON,
J. H. ATCHISON.

Copies of this patent may be obtained for five cents each, by addressing the "Commissioner of Patents, Washington, D. C."